Patented Aug. 14, 1928.

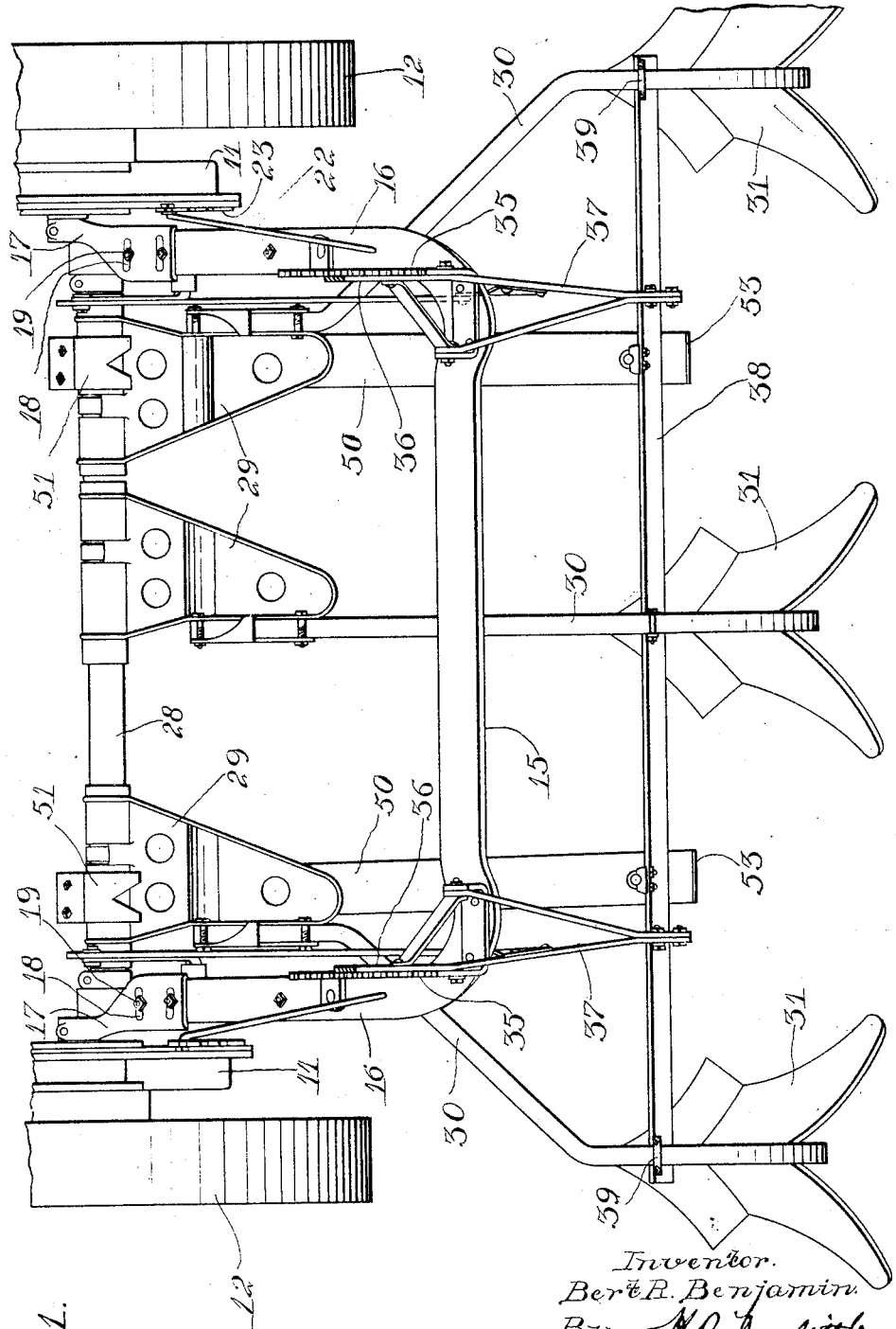

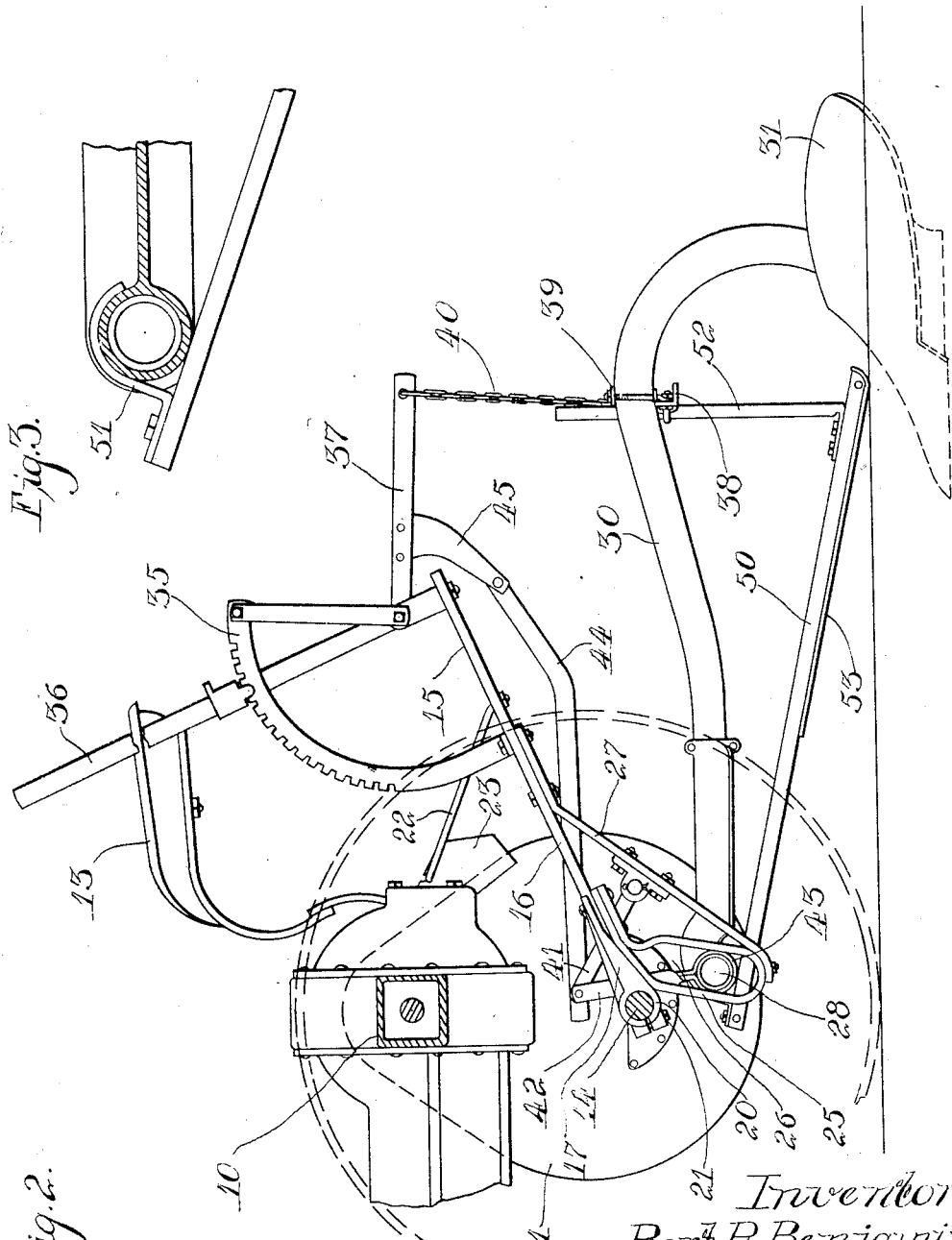

1,680,846

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

TRACTOR ATTACHMENT.

Application filed January 20, 1927. Serial No. 162,260.

This invention relates to tractor operated tillage implements and more particularly to combination with a tractor of an attachment comprising an assembly of earth working tools designed as an attachment for the tractor.

The main object of the invention is to provide a tillage attachment especially designed for lister plowing and for use with tractors of the row crop type, which attachment will be self-governed as to depth of plowing.

Another object is to arrange furrow forming plows of the middle breaker type on an attachment in such a manner as to cooperate with tractors of the type having rear wheels spaced to straddle a space sufficient for two plant rows to simultaneously form a plurality of furrows, and to provide depth gauging means in connection with the plows that will automatically govern depth of plowing and permit operation of the plows on light or sandy soils.

The foregoing and other minor objects are accomplished by providing a draft frame adapted to be attached to the rear of a tractor, the draft frame carrying tillage means comprising a novel arrangement of plows and depth gauging skids or runners arranged between the plows and movable jointly therewith, and operating in a manner to maintain an even depth of plowing and prevent excessive digging in of the plow units, as will hereinafter be more specifically described and then defined in the claims.

Referring to the drawings:

Figure 1 is a plan view showing the rear end of a tractor with the attachment in position thereon;

Figure 2 is a similar side view; and

Figure 3 is an enlarged detail of the connection for the depth gauging means.

The invention is herein disclosed in combination with a tractor having rear wheels of the wide tread type and an upwardly arched rear axle structure having a transverse housing 10 containing the differential and the lateral shafts extending therefrom, and depending housings 11 having upper portions fixed to the ends of the transverse housing and containing gearing driven by the differential shafts, which in turn drive the spindles of the traction wheels 12 projecting from the outer faces of the housings 11. The central portion of the housing 10 carries a driver's seat 13, as shown in Figure 2.

On the lower portions of each of the housings 11 there are inwardly projecting cylindrical bosses 14 which support a transversly extending and rearwardly projecting U-shaped supporting frame or bar 15. The bar 15 is preferably formed from a rigid flat metal bar with its parallel arms 16 extending at right angles to the straight transverse portion of the bar. On each of the arms 16 there is a coupling bracket 17 having a widened rear portion provided with a pair of transverse slots 18 receiving fastening bolts 19 which secure the brackets to the arms. Each bracket 17 is formed with a split bearing head 20 (Figure 2) adapted to be mounted on the boss 14. Numeral 21 designates a locking bolt serving to retain the bearing on the boss 14. Through provision of the slots 18, the brackets 17 may be shifted laterally to engage or disengage them from the bosses 14. It is, therefore, possible to easily connect and disconnect as a unit the supporting bar 15 and parts carried thereby to and from the tractor, as desired. Numeral 22 designates suspension links which connect the rear portion of the bar 15 with brackets 23 on the upper portions of the axle structure of the tractor, thereby supporting the bar 15 in fixed position. Beneath the forward end of each arm 16 and supporting bar 15 there is secured a depending draft bracket 25, which may be formed of a flat bar looped upon itself to provide a substantially vertical slot or guideway 26. The ends of the bracket 25 are secured together and to the arm 16 by means of the bolt 19, which retains the pivot bracket 17 in position. The diagonal bar 27 extends from the lower end of the draft bracket 25 to the under side of the arm 16, serving as a brace and for another purpose to be described. A transverse draft bar 28, which may be cylindrical, as shown, bridges the space between the ends of the arms 16 and has its ends engaged in the guideways 26 of the bracket 25. On draft bar 28 there are mounted pivoted coupling plates or brackets 29 to which are fastened the forward ends of drag beams 30 which trail from the draft bar. Preferably, three such brackets and beams are used. The plow beams extend rearwardly in a substantially horizontal plane and then curve downwardly in the usual way to form standards carrying plow bodies 31. On each side of the frame 15 there is mounted an arcuate rack bracket 35 on which there is pivoted a lever 36 having the usual latch mechanism cooperating with the locking rack, as shown. Each lever has a rearwardly extending, rigid lifting arm 37. A transverse spacing bar 38 extends across the plow beams and is secured to each of said beams by suitable means such as clamping bolts 39. A chain or equivalent flexible connection 40 connects each lifting arm 37 with an intermediate point on the bar 38.

In order to provide for parallel lift of both ends of the plow beam, each brace bar 27 has mounted on it a swinging arm or lever 41 (Figure 2), the end of which is connected by a link 42 to one end of the bar 28 by means of a clamp collar 43 receiving the bar. The end of each lever 41 is also connected by a link 44 with a rigid depending bracket 45 extending from the lifting arm 37 on each lever 36. By this arrangement vertical swinging movement of arm 37 will communicate similar movement through link 44 to the lever 41, causing link 42 to raise or lower the draft bar 28 in the guideways 26 in unison with the movement of the rear portions of the plow beams. The action of the lifting mechanism is to give an initial parallel lift to the plow beams until the upper end of the guideway 26 is reached by bar 28, after which the rear ends of the beams with the plows may be given additional lift.

The structure so far described is largely that described and claimed in co-pending application Serial No. 731,104, filed August 9, 1924, and forms no part of the present invention except as it enters into the novel combination and arrangement of elements hereinafter claimed. In the practice of the present invention the draft bar 28 preferably has attached to it a series of two or more plow beams 30. For the purpose of illustration, three plows and beams are shown in Figure 1. In the preferred construction the outer plows are formed with outwardly deflected beams connected at their forward ends with the draft bar 28 adjacent its ends and having their rear ends outwardly offset in a manner to bring the plows thereon behind or in the tread of the tractor wheels. A third centrally positioned plow may be used having a straight beam connected to bar 28 through bracket 29, the arrangement of plows being such that furrows will be formed at a spacing usually adopted for plant rows in the practice of lister planting and without leaving packed wheel tracks. In the spaces between adjacent plows and in alternating relation thereto, depth gauging means is provided consisting of elongated runners or skids 50, two of which are shown. Each skid has its forward end connected to the bar 28 by means of curved brackets 51, which engage or hook over the cylindrical bearing portion of the outer coupling brackets 29 and have pivotal movement on bar 28 together with said brackets as well as pivotal adjustment thereon. Each skid extends rearwardly and downwardly from the bar 28 to a point on the transverse vertical plane passing through the plows; that is to say, to a transverse line adjacent the rear ends of the beams 30 and beneath spacing bar 38. The rear end of each skid 50 is provided with an upright support or standard 52, shown in this instance as rigidly secured to the upper face of the skid and having its upper portion adjustably clamped to spacing bar 38 at a point midway between adjacent plows. Preferably, the skids 50 are formed of wood with the under faces thereof faced with metal, as at 53, for such portion of the length of the skid as appears desirable.

With the arrangement described there is provided an assembly of lister plows having long, gradually inclined runners or skids between each pair of plows, which present a continuous flat surface to the soil. Provision of the skids constructed and arranged as described permits operation of middle breaker plows in light or sandy soils and obviates the tendency of such plows to dig into such soils to an abnormal depth even though the traction wheels should sink into it, as the flexible lifting connections 40 permit the skids and plows to float on the axis of the bar 28 independently of the movements of the tractor. The rear ends of the skids can be given vertical adjustment to meet soil conditions, etc.

It will be evident that there has been provided a tractor attachment which may be readily connected to or disconnected from the rear of a tractor, as a unit, and which affords an organization particularly well adapted to working efficiently in light or sandy soils. While the preferred embodiment of the invention has herein been described, it will be understood that certain modifications may be made without departure from the scope of the invention as defined in the following claims.

What is claimed is:

1. In an earth working implement, the combination of a horizontal draft bar, a plurality of spaced drag beams having forward ends connected to the draft bar, earth working means on the rear end of each beam, a transverse spacing bar connecting the rear portions of the beams, a ground engaging skid located between the beams having its forward end secured to the draft bar, and an upright member on the rear end of the skid having its upper portion secured to the spacing bar.

2. In an earth working implement, the combination of a horizontal draft bar, a series of spaced drag beams having forward ends connected to the draft bar, spacing means connecting the rear portions of the beams, earth working means on the rear end of each beam, a series of spaced depth gauging skids alternating with the drag beams and having their forward ends connected to the draft bar with each skid extending rearwardly and downwardly and terminating in a space between adjacent earth working means, and an upright standard on the rear end of each skid having its upper portion connected to the spacing means.

3. The combination with a tractor of a tillage attachment comprising plows having beams pivotally supported at one end on the tractor for vertical movement, depth gauging means for the plows comprising skid members in laterally spaced relation to the plows, means connecting the forward ends of said skid members to the tractor for movement on the same axis as the plow beams, and means connecting said skid members with the plow beams for joint movement.

4. The combination with a tractor of a tillage attachment comprising a draft frame including a transversely extending draft bar, a plurality of plows having beams pivoted at one end on the draft bar, depth gauging means for the plows comprising skid members in laterally spaced relation to the plows and substantially coextensive with the beams, means connecting the forward ends of said skid members to the draft bar, and means connecting the rear end of each skid member in fixed relation to the adjacent plow beams.

5. The combination with a tractor having rear wheels spaced to afford a wide tread, of two laterally spaced plows having inwardly converging beams pivotally connected to the tractor between said wheels, and depth gauging skids located in the space between the plows and extending from the pivot point of each plow beam to a transverse line adjacent the ends of the beams, and a cross bar connecting said skids to the beams for joint movement.

6. The combination with a row crop tractor having rear wheels spaced to afford a wide tread, of a lister plow assembly comprising outer plows positioned in the tread of said wheels and having inwardly converging beams pivoted to the tractor between said wheels, a central plow and beam pivoted midway between said outer plows, said plows being positioned to engage the ground at points corresponding to the distance between alternate plant rows, depth gauging skids located midway between the outer and central plows and connected thereto for joint vertical movement, and means connecting said plows and skids to the tractor for adjustment vertically.

In testimony whereof I affix my signature.

BERT R. BENJAMIN.